Sept. 9, 1969   G. H. ROGERS   3,465,881
CONTROL MECHANISM FOR WATER SOFTENING SYSTEMS
Filed June 27, 1967   3 Sheets-Sheet 1

INVENTOR.
GERALD H. ROGERS
BY Williamson, Palmatier & Bains
ATTORNEYS

Sept. 9, 1969 G. H. ROGERS 3,465,881
CONTROL MECHANISM FOR WATER SOFTENING SYSTEMS
Filed June 27, 1967 3 Sheets-Sheet 2
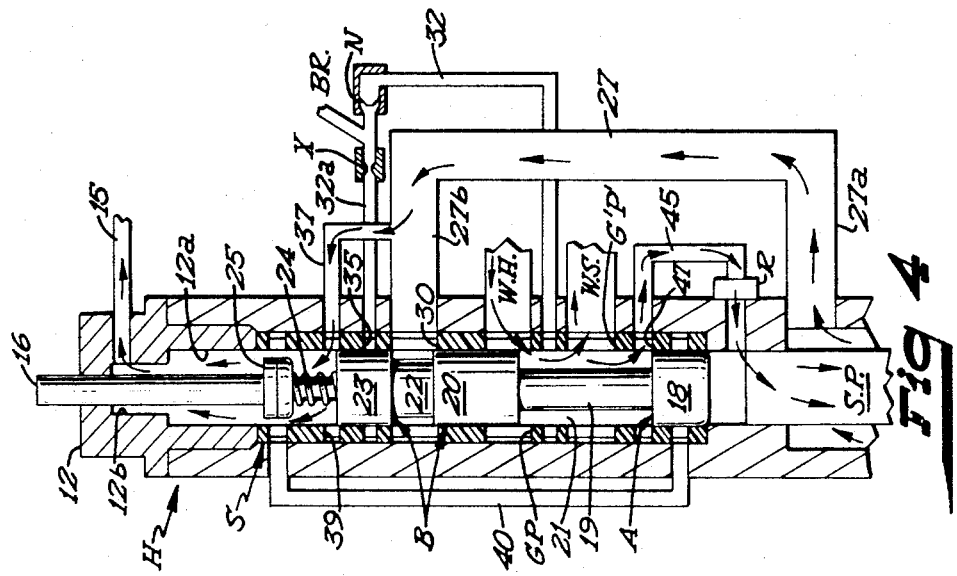
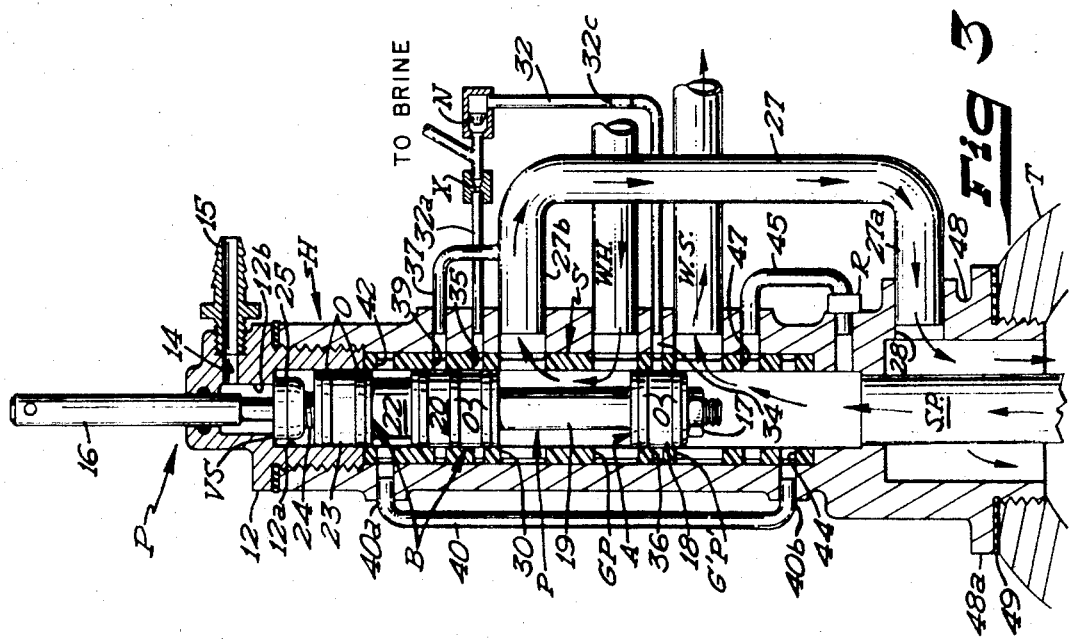
INVENTOR.
GERALD H. ROGERS
BY Williamson, Palmatier
& Bains ATTORNEYS

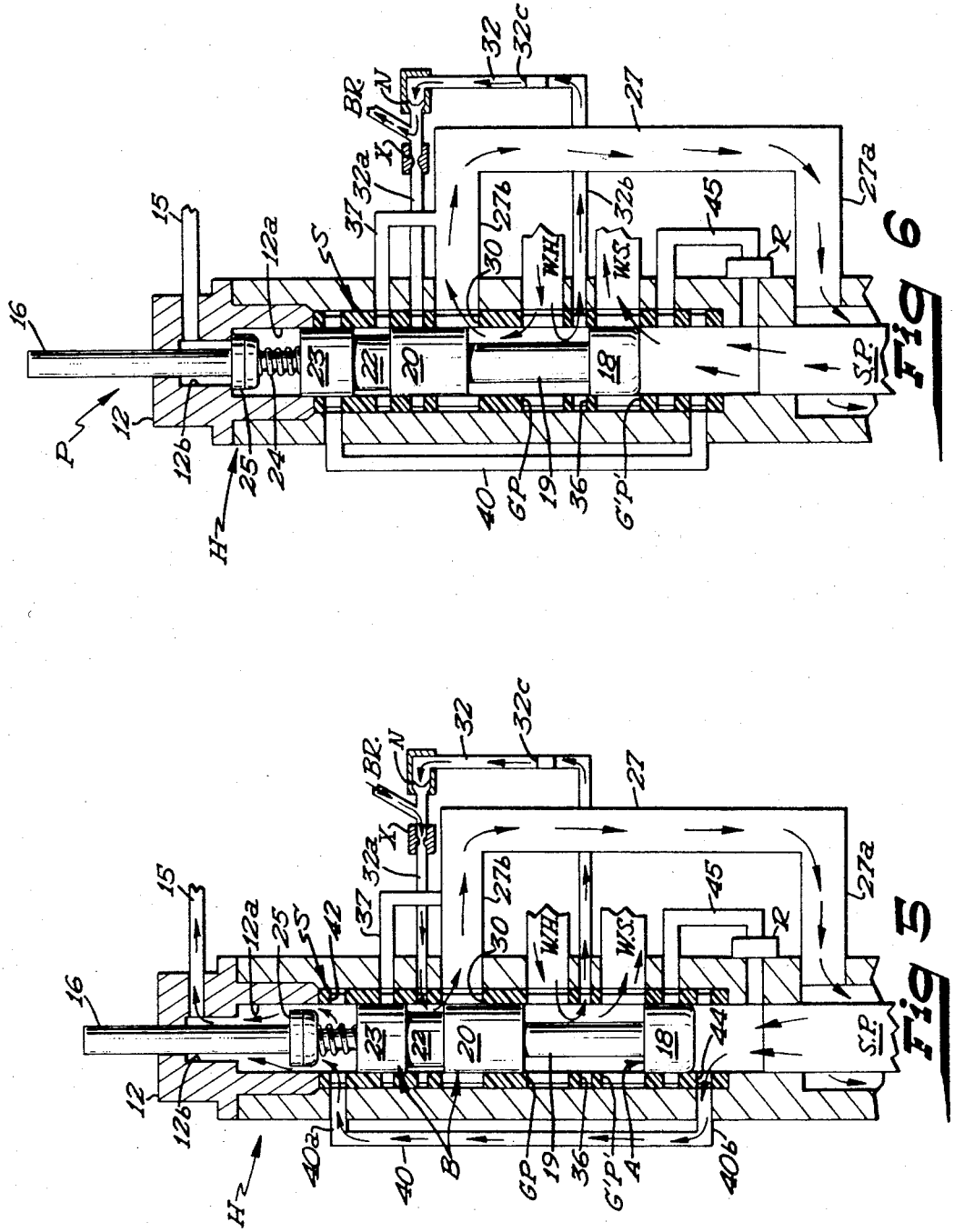

United States Patent Office 3,465,881
Patented Sept. 9, 1969

3,465,881
CONTROL MECHANISM FOR WATER
SOFTENING SYSTEMS
Gerald H. Rogers, Elmore, Minn. 56027
Filed June 27, 1967, Ser. No. 649,286
Int. Cl. C02b 1/22, 1/76
U.S. Cl. 210—143
8 Claims

ABSTRACT OF THE DISCLOSURE

A control mechanism which may be mounted in and upon a unitary housing medium, and wherein all of the various flow cycles are controlled by predetermined, relative movements of a single elongated plunger element.

---

This invention relates to simplified and improved control mechanism for water softening systems which employ a treatment tank containing a bed of a suitable softening agent and a regenerant tank for periodically regenerating the bed of the softening agent.

My invention is particularly adapted (but not limited to) for household water softening apparatus. The art for household water softening systems is today well developed and essentially in method, includes the passage of hard or untreated water through a bed of suitable softening agent such as high capacity resin material, often abbreviated as H.C.R. or zeolite to exchange chemical ions and to, during service, cause the treated water to flow to various service outlets.

In said systems means are provided to regenerate the chemical bed by passing a brine solution therethrough, followed by a rinse with untreated water to then flush away excess brine and the calcium or magnesium ions removed from the untreated water during the softening cycle. The softening chemical is contained in a bed within a mineral tank, into which the untreated water is flowed, and from which the softened water flows to service.

The second tank contains the regenerant or brine solution, and usually employs a float mechanism or equivalent control by which the quantity of brine withdrawn for one regenerative cycle is governed.

Control mechanism is customarily provided, involving a plurality of valves and often solenoid-controlled valves, by which the flow paths are altered from those of the softening cycles to those for the brining and rinsing cycle and the brine refill cycle.

It is an object of my invention to provide simplified control mechanism of the class described, which is fully automatic in nature, for providing continuous service to a number of soft water outlets in one step of a cycle, and for a predetermined, relatively short time, to provide for backwash with an uphill flow of the water and, thereafter, under time control, to provide for a relatively long brine and rinsing cycle. Thereafter, a final relatively short duration cycle is provided for brine refill.

A further and important object is to provide control mechanism of the class described which may be, as to all controlling elements, mounted in and upon a unitary housing medium, and wherein all of the various flow cycles are controlled by predetermined, relative movements of a single elongated plunger element.

A further object is the provision of control mechanism of the class described wherein the combination of ports and passages, controlled for interconnection by a single longitudinally movable member, will withstand long continued usage, and thereafter for reconditioning, requires only the pulling from the mounting-housing of a passage and chamber-forming sleeve with a subsequent replacement thereof with a new sleeve.

Another very important object is to provide control mechanism of the class described, wherein the drain line, essential as a part of the system, is maintained in closed relation during the servicing operation of the system, and also during the brine refilling stage of the cycle.

The foregoing and other objects of this invention will be more apparent from the following description made in connection with the accompanying drawings wherein:

FIG. 3 is a somewhat diagrammatic vertical section showing the essential elements of my control mechanism as they are positioned for servicing the various outlets of a household water system;

FIG. 4 is a similar diagrammatic section showing the shifted position of a common longitudinal valve constituting medium in the second stage of operation for producing "backwash" and before any flow of brine takes place;

Figure 7:
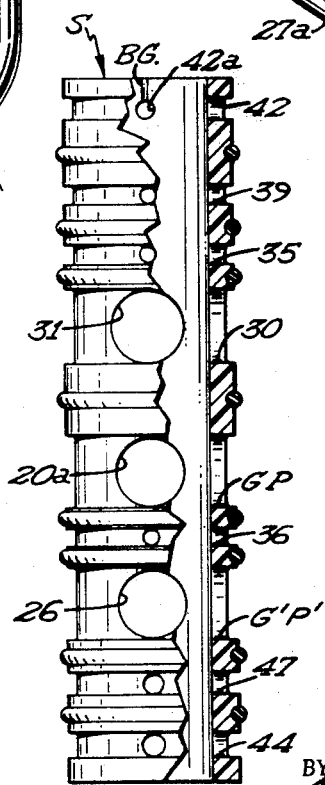

FIG. 5 is a similar vertical section showing the positioning of the unitary control plunger during the stage of applying brine and rinsing to the system; and FIG. 6 is a similar section showing the shifted position of the control elements during the relatively short brine refill stage of my mechanism; and FIG. 7 is a view partly in side elevation and partly in vertical section, showing the passage-forming sleeve S detached.

It will be understood that my automatic control mechanism will be employed in a water softening system which comprises the tank T containing a bed of water softening mineral or chemical, through which the hard water is passed during service of the system; and which system also employs a conventional type of regenerant tank containing a bed of regenerant chemical such as sodium chloride; and having overflow control means with a valve operable to shut off the flow of regenerant from the tank to the treatment tank when a predetermined level in the regenerant tank is reached.

Referring now specifically to the embodiment of my invention illustrated, I provide as shown, a unitary mounting and support housing H consisting essentially in a vertically disposed, cylindrical member having a substantially concentric, smooth bore 10 extending through the greater part of the length thereof, and having its upper end tapped to form a threaded seat 11 for receiving a closure plug 12 which is recessed cylindrically from the lower extremity throughout a portion of its height, to form a cylindrical chamber 12a communicating at its upper end with a smaller and preferably concentric drain connection chamber 12b. Plug 12, at its peripheral flange 12c is sealed with the upper edge of housing H as by a gasket 13. The top of the plug 12 has a lateral drain passage 14 therethrough communicating with a drain line fitting 15 which has its end threadedly and sealingly connected with the plug and the drain passage 14.

The smooth, cylindrical interior or bore 10 of housing H extending from the lower end of plug 12 to a lower shoulder 12s is adapted to snugly and slidably receive a tubular and cylindrical, preferably integral sleeve indicated as an entirety by the letter S, which may be constructed of a suitable and durable plastic material, having a low co-efficient of expansion or of suitable metal or other composition. As indicated, sleeve S is preferably of integral construction closely fitting the interior or bore 10 of the housing and is provided at spaced zones thereof, as will later be more in detail explained, with a series O-rings seated in semi-annular grooves and which tightly seal against the inner periphery of the housing, while however, permitting the said sleeve S to be bodily pulled and disengaged with the housing for replacement of a new sleeve when required.

The lower end of sleeve S abuts against the shoulder 12s, thus precisely positioning at predetermined levels, certain undercut, communicating passages which will later be described in detail.

A single and unitary valve forming and valve controlling member in the form of a plunger indicated as an entirety by the letter P, is provided and is mounted for longitudinal and axial shifting and slide movements concentrically of the cylindrical housing H. The plunger P includes a preferably solid, coaxial actuating rod 16 extending preferably throughout the entire length of the plunger, and having as shown, a threaded lower extremity 16a which has adjustably screwed thereon a nut 17 adapted to abut against and position the lowermost spool A of a series of valve constituting and flow controlling spool sections and valves constituting parts of plunger P. Spool A and the other control spool B hereafter to be described, may be constructed of suitable rigid and durable plastic or of a metal having a low coefficient of expansion, or other composition, and the spools are concentrically drilled to closely fit the cylindrical contour of rod 16. Spool section 18, of spool A as shown, is provided with upper and lower O-ring grooves in which are seated the O-rings O for making sealed contact with the interior of the sleeve S. An elongated spacer tube 19 has sealed engagement at its lower end with spool A and at its upper end abuts in sealed relationship, and determines the positioning of an elongated upper control spool designated as an entirety as B. Elongated, upper spool B has a lower spool section 20 provided as shown with three O-rings O, dividing the periphery into two zones. Spool B has the upper spool section 23 divided into a zone by two widely spaced O-rings and this section is preferably integrally formed with the lower spool section 20 and interconnected thereby by an integral connecting sleeve 22 of less diameter than the spool sections 20 and 23.

The annular space between sleeve 22 and the portion of the enlarged sleeve S (through all moved positions of the plunger P) defines an annular communications passage.

The rather long, annular space between spools sections 18 and 20, forms in conjunction with the interior bore of sleeve 20 a shiftable communication chamber identified as 21.

An annular spring socket 24a is formed through the uppermost half of the elongated spool B concentrically with the plunger rod 16, wherein an elongated valve-operating coil spring 24 is accommodated surrounding plunger rod 16. The upper end of coil spring thrusts against a cylindrical drain control valve 25 slidably mounted upon the upper smooth periphery of plunger rod 16 and carrying one or more internal O-rings (not shown) for sealed engagement with the plunger.

In the fully raised position of the plunger P, as shown in FIG. 3, and in the fourth stage raised position of the plunger shown in FIG. 6, illustrating the "brine refill" stage, the valve 25 is thrust by pressure of spring 24 upwardly and tightly against an annular valve shoulder VS which is disposed at and defines the lower end of the restricted upper drain passage 12b and its communication with the larger cylindrical chamber 12a.

A circular radially extending hard water inlet passage IP is formed radially through the intermediate portion of cylindrical housing H, communicating with an undercut, annular groove passage GP formed in the horizontally aligned zone of sleeve S and which groove passage communicates with the interior of said sleeve through a plurality of circular ports 20a. A hard water supply pipe W–H communicates with the radial passage IP through the housing. A soft water outlet passage O–P extending radially through the housing below the inlet passage I–P communicates with a soft water service pipe W–S and has communication with a relatively wide undercut annular passage G′–P′ through the sleeve S through a plurality of circular ports 26.

A U-shaped by-pass conduit 27 having an internal diameter approximating that of the hard and soft water pipes W–H and W–S has its lower horizontal arm 27a in communication with a radial port 28 provided in the lower portion of housing H some distance below the lower end of sleeve S. The upper horizontal arm 27b of the enlarged by-pass conduit 27 communicates with a circular radial port 29 formed through the intermediate portion of housing H and said port 29 communicates with a relatively wide, annular undercut passage 30 formed in sleeve S, which passage in turn, communicates with the interior of the sleeve through a plurality of large circular ports 31.

A brine-injector medium which, as shown, includes a U-shaped by-pass conduit 32 is provided for communication at its upper horizontal arm 32a and its lower horizontal arm 32b with small radial ports 33 and 34 respectively, formed through contingent portions of the housing H. The upper port 33 communicates with a narrow, undercut, annular passage 35 formed in the periphery of the adjacent portion of sleeve S, which passage in turn communicates through radial ports 35a with the interior of the sleeve. The brine by-pass conduit 32 as shown, has in the upper horizontal arm thereof, a somewhat restricted throat X to the rear of which, in the line, an injector nozzle N is provided. A brine connection conduit BR communicates and is connected to the upper horizontal arm 32a, closely adjacent injector nozzle N. A conventional injector screen 32c is mounted in line 32 below nozzle N. The lower housing communication port 34 communicates, as shown in FIG. 3, with a narrow, annular undercut passage 36 in the contingent periphery of sleeve S, which communicates with the interior of the sleeve through certain radial ports.

An L-shaped backwash by-pass 37, as shown in FIG. 3, communicates at its horizontal upper portion with a radial port 38 formed through the contingent portion of housing H, and which radial port communicates with an annular undercut passage 39 formed in the periphery of the upper portion of sleeve S and having communication with the interior of said sleeve through a plurality of suitable radial ports 39a. The lower (as shown, vertical) arm 37a of the backwash by-pass, as shown in FIG. 3, communicates with the upper horizontal portion 27b of the enlarged by-pass conduit 27.

As shown at the left side of the housing (FIG. 3), an elongated brine and rinse by-pass conduit 40, interconnects the lower portion of the interior of the housing and sleeve with the upper portion of the housing and sleeve. Conduit 40 has an upper turned horizontal end 40a which communicates and is connected with a radial port 41 formed through the housing which port in turn communicates with a narrow annular undercut passage 42 in the periphery of the uppermost portion of sleeve S. Annular passage 42 communicates with the interior of the sleeve through suitable radial ports. The lower turned end 40b of brine and rinse by-pass is connected with and communicates with a radical passage 43 formed in the contingent lower portion of housing H, which passage 43 communicates with a narrow undercut annular passage 44, formed in the contingent periphery of sleeve S, and in turn communicates with the interior of the sleeve through radial ports 44a.

A short lower U-shaped backwash conduit 45 connects the interior of sleeve S below the position of the soft water outlet pipe W–S with the vertical standpipe S–P of the treatment tank. The upper horizontal end 45a of said backwash conduit is connected with a radial port 46 formed in the contingent portion of the lower part of housing H, which port in turn communicates with a narrow annular channel 47, undercut in the periphery of sleeve S.

The backwash conduit 45, at its lower portion, has a conventional backwash flow-regulator mounted therein. It will be noted (see FIG. 7) that a bleed groove BG is provided in the upper end interior of sleeve S communicating with one of the radial ports 42a. This groove is quite essential to provide for sliding movement of the important plunger member P in upward direction at such stages when drain control valve 25 is closed.

Figure 1:
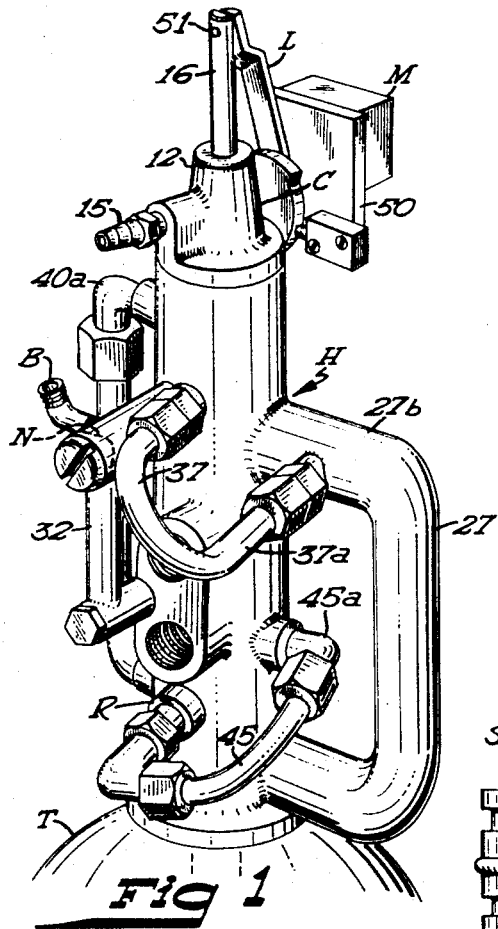
FIG. 1 is a front perspective view, with some portions broken away to show others in cross section, of an embodiment of my invention applied to a household water softening system and apparatus.

Referring now to FIGS. 1 and 3 of the drawings, it will be noted that the embodiment of my invention illustrated has provision for installation and support of the integral housing H and its related and supported parts upon the top of a conventional treatment tank T. The flanged base 48 of the housing, as shown in FIG. 3, carries an externally threaded skirt 48a which engages an internal thread formed in the opening at the top of the tank, suitable sealing means such as a gasket 49 being provided.

Figure 2:
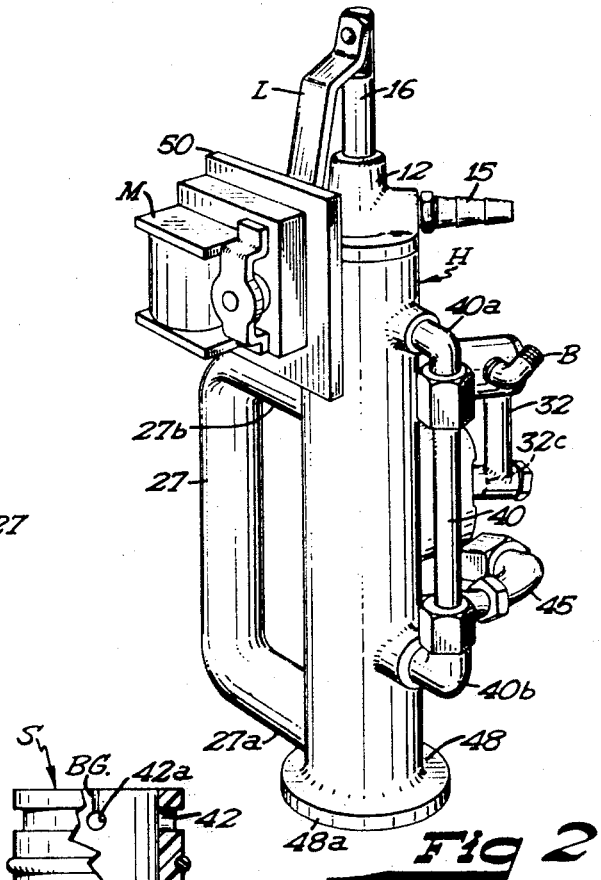
FIG. 2 is a rear perspective view of said embodiment.

As shown in FIGS. 1 and 2, a conventional type of electrical drive motor M is attached by a mounting plate 50 to one side of the upper portion of the integral housing H. Motor M is conventionally provided with transmission speed reduction mechanism having an ultimate driven shaft which is fixedly connected to a conventional type of cam C. Cam C on the rearward face thereof, has a pitman connection (not shown) with the pitman link L, the upper end of which is pivotally connected to the plunger rod 16 by a cross pin 51.

The stages on the cam C in conventional manner, determine the several stages of the plunger during a 360° revolution of the driven shaft and cam.

It will be understood that time control mechanism of conventional type (not shown) is employed with suitable electrical connections and switch means in a circuit including the motor. Such time control mechanism may constitute a calendar clock and will control energization of the motor during predetermined time intervals. For example, the stage of the control mechanism and plunger P for servicing may be of a duration of 24 hours, or even up to a week or two weeks before regeneration is required.

The variable time periods for the second (backwash), third (brine and rinse) and fourth (brine refill) stages will be herein commented upon subsequently, under the title "Operation."

From the foregoing description and reference to FIGS. 3 through 6 of the drawings, it will be seen that the enlarged bypass conductor duct 27 serves as a common means or passage to selectively interconnect several passages with the top of the treatment tank outside of standpipe SP.

In the service stage of the shiftable main valve mechanism, the common passage 27 interconnects the untreated or hard water supply WH with the top of the tank, outside of standpipe SP, as indicated by arrows. In the backwash stage the common passage 27 connects the top of the tank through the upper backwash bypass 37 with the drain chamber (chambers 12a and 12b), drain valve 25 then being open.

In FIG. 5 the "Brine" and "Rinse" stage common passage 27 interconnects the injector outlet 32a with the upper part of the tank T. In FIG. 6, "Brine Refill" common passage 27 again connects the hard water inlet WH with the top of the tank and simultaneously therewith, the untreated water inlet 32b is connected with the untreated water supply. The term "common passage" will be used in the appended claims to designate a medium such as the large conduit 27 having the multiple functions.

OPERATION

It will of course be understood that with a main shiftable valve means in the form of a unitary plunger or the like, in combination with selective passages and chambers formed by a common stationary assembly such as housing H with the removable integral sleeve S interfitted therewith (performing the particular movements of the main valve member for putting into effect three or four stages in a complete cycle of continuously softening water for service, then preparing for regeneration of the chemical in the treatment tank as by backwash, and then regenerating, and then finally refilling brine, the plunger or main shiftable valve member could move in various positions, depending upon the arrangement of supply and receiving passages and chambers.

In the operation of the embodiment of my invention herein disclosed, four steps are employed in the complete cycle of servicing and softening the water for a household or other service lines, backwashing for a requisite, rather short period before any application of regenerate brine, then the stage of providing brine and rinsing simultaneously and the final stage of refilling the regenerate or brine tank.

In the service stage of my mechanism and system, as shown in FIG. 3, the shiftable valve plunger P is shifted by the time controlled, motor actuated cam C to uppermost position, at which time the spool section 18 covers the annular undercut passage 36 through the sleeves and closes supply of hard water to the bypass conduit 32 connected with the nozzle end and supply of brine. In this stage, the supply of untreated water from the pipe WH is communicated to the upper end of common passage 27, passing downwardly therethrough as shown by the arrows in FIG. 3, and entering the top of tank T outside of the standpipe SP. From there, the hard water passes through the treatment bed (not shown) at the lower portion of tank T, and then upwardly and axially through the standpipe SP to communicate with the lower end of sleeve S and to then turn and flow through the service line WS to the various faucets of the supply system.

It will be noted that in said service stage, the drain control 25 is firmly closed, thereby preventing any communication of water to the drain chamber 12b.

The cooperating parts and elements of my mechanism and system are maintained for relatively long durations dependent upon the gallonage normal use for soft water in the system in the service stage.

When, as set for regeneration of the chemical in the softening tank, the time control mechanism actuates the cam-driving motor, the nature of the next stage cam is such, (as shown in FIG. 4) to lower the plunger P to lowermost position in which the drain control valve 25 is fully open and the upper backwash bypass connected with common passage 27 is then in communication through the undercut annular passage 39 of the sleeve with the interior of the sleeve above the then location of the spool section 23, thus communicating water flow from the common passage to the drain 15. In this same stage, as shown by the arrows, the untreated water supply pipe WH is connected for communication with the lower backwash bypass 45, thereby supplying untreated water to the top of the standpipe SP of the tank, then through the chemical bed and upwardly surrounding the standpipe, into communication with the lower arm 27a of common passage 27.

In the same stage spool section 23 closes communication with the ejector outlet of the brine line 32. It will also be seen that since the spool section 20 is intermediately disposed in opposition to the entering untreated water line WH, a portion of the untreated water, if service is demanded in the supply pipes, will be communicated to the respective faucets of the system.

In the next stage of operation shown in FIG. 5 (brine and rinse) the main valve means or plunger P is lifted one step above the backwash position, thereby with reference to the lower end of the plunger interposing spool section 18 to close the lower backwash bypass 45 while at the same time opening the undercut annular passage 44 of the sleeve for communication from the standpipe SP of water through the brine and rinse bypass 40, as indicated by the arrows in FIG. 5. This bypass water communicates with the drain chambers 12a and 12b to which is openly connected the drain pipe 15. It is to be noted in this brine and rinse stage, the drain valve 25 is fully open. In this situation the supply of hard water through pipe WH is communicated to the intake end of the ejector nozzle device, passing through the screen 32c and then through the nozzle N. The pressure is such with the throat X on the outflow side of the nozzle that a venturi action is produced, drawing brine from the brine tank through the angularly connected brine supply pipe BR. The brine so drawn and flowed enters the interior of sleeve S and is then communicated to the upper end 27b of the common passage, flowing downwardly therethrough, as shown by the arrows, into the top of tank T and then through the chemical bed of the tank, then upwardly through the standpipe SP and through the brine and rinse bypass 40.

In the final, "Brine Refill" position shown in FIG. 6, the main shiftable valve means (plunger P) is moved a step upwardly from its position in FIG. 5. In this "Brine Refill" position, untreated water from the supply inlet W–H flows into the common passage 27 as shown by the arrows in FIG. 6, and then downwardly through the top of treatment tank T outside of the stand pipe S–P, then through the bed in the tank and upwardly through the stand pipe. Simultaneously, some of the untreated water entering from inlet W–H is caused to flow by pressure through the injector by-pass, entering the inlet 32b and then passing through the screen 32c, upwardly and through the nozzle and upwardly through the brine communicating conduit B–R. No flow can pass through the outlet of the injector system since the spool section 20 in said brine refill position causes communication of the injector outlet. It will be noted that in brine refill the drain valve 25 is closed.

After the requisite short time period for brine refill, the plunger P is, by time controlled movement of the essential cam, raised upwardly one step to the service position shown in FIG. 3.

From the foregoing, with reference to FIGS. 3 thru 6 of the drawings, it will be seen that my control mechanism and system provides with a unitary shiftable main valve means a thorough backwash of the tank and the important common passage 27 and drain passage 12a, all before any brine or regenerate liquid is supplied in the flow. Thereafter the regenerate liquid or brine is caused to flow through the common passage, through the treatment bed of the tank and upwardly from the tank through the stand pipe S–P into a brine and rinse backpass 40 and then, thence, to the drain.

It will further be seen that my control mechanism employs a single unitary main valve plunger cooperating with certain undercut and radial passages formed in a replaceable sleeve S. All of said sleeve passages are communicable with said ports formed in a common housing member H. Requisite O-rings are provided in the spool sections of the shiftable plunger P to form sealed contact with the smooth cylindrical interior of sleeve S. Likewise, it is desirable to seal the exterior periphery of the sleeve with zones of the housing cylinder. To this end, external O-rings are provided in suitable grooves in the periphery of the sleeve as shown in FIG. 7.

My mechanism and system will withstand and successively operate during long continuous use. When in due time the O-rings carried by the spool sections of the plunger become worn and the interior of said sleeve S becomes worn, it is only necessary for complete conditioning of my mechanism and system to remove the plunger, replace the O-rings thereon and then pull the sleeve after removal of the plug 12 from the cylinder by insertion of any conventional, well-known rod having an expansible head to engage one or the other set of radial ports 31, 20a or 26 of the sleeve. After pulling of the sleeve, a new or replacement sleeve may be properly inserted and seated within the common housing.

From the foregoing description, it will be seen that I have provided a control mechanism and system of the class described, which is fully automatic in nature and which is economical as to volume requisites of the regenerate brine and which has improved results in precise operation of the four stages, which comprise softening service stage of the system, complete backwash stage with the injection of brine, brine and rinse stage and the final brine refill stage.

The interposition and functioning of the drain closure valve 25 is important in the several stages and contributes to the unitary improved results.

In the brine and rinse stage (FIG. 5) and brine refill stage, any excess air or bubbles accumulated in the top of the treatment tank will be communicated to the drain and/or to the brine tank and will be not be communicated to the service outlet W–S.

It will, of course, be understood that the various changes may be made in the sequential arrangement of passages, ports and communicative parts and in the sequential movement and reciprocation of plunger P, all within the scope of my invention as defined in the appended claims.

I claim:

1. In control mechanism for a water softener system which employs a treatment tank having the usual chemical bed, a standpipe and an upper hard water inlet passage,
   a regenerant tank having the usual check valve and control means,
   an untreated water inlet passage and a water outlet passage for servicing the system,
   those improvements which comprise:
   a drain passage,
   a backwash bypass communicating with said drain passage.
   a valve for closing said drain passage,
   a brine and rinse bypass for connecting the standpipe of the treatment tank with said drain passage,
   a brine ejector having an untreated water inlet and an ejector outlet,
   a common passage adapted to connect the top of treatment tank selectively with said hard inlet and with said backwash bypass,
   shiftable main valve means comprising a passage-forming rigid housing, a unitary reciprocal plunger having a plurality of longitudinally spaced passage-closing sections thereon, and a stationary sleeve member having cooperating, communicating passages therein and being mounted in said housing operable in one predetermined position to cause flow of water from said untreated water inlet to said treatment tank, through said bed, and from said treatment tank to said service outlet passage,
   operable in a backwash, second predetermined position to cause flow of water from said untreated water inlet to the upper end of said standpipe and through said bed to the top of said tank, and then through said common passage and said backwash passage to said drain passage,
   operable in a third, brine and rinse position to cause flow of water from said untreated water inlet through said injector, then through said common passage into the top of said treatment tank, and then through said bed and out of said tank through said brine and rinse passage, and into said drain passage,
   and operable in a fourth brine refill position to cause refill with water of said regenerant tank.

2. The structure and combination set forth in preceding claim 1, further characterized:
   said shiftable main valve in said last mentioned or fourth brine refill position, causing flow of water from said hard water inlet through said common passage into the top of said tank and through said bed, and up through said tank into said service outlet, and simultaneously causing flow of untreated water through the inlet of said injector and through said common passage into the top of said tank.

3. The structure set forth in preceding claim 1 further characterized by:

the shifting of said main valve means, causing closing of said drain passage valve in the servicing and brine refill stages of said mechanism, and causing opening of said drain passage valve in the backwash and brine and rinse stages of said mechanism and system.

4. The structure set forth in preceding claim 1, and a common mounting housing for said sleeve and said unitary plunger, said housing having intermediate passages therethrough for connection with the untreated water inlet and treated water discharge of said system, and having a pair of spaced passages for communication with the ends of said common passage, and having a passage of smaller cross sectional area for communication with said backwash passage, and having a drain passage in one end thereof, and having a pair of spaced passages for communication with the two ends of a brine and rinse bypass, and said sleeve having corresponding undercut passages in the periphery thereof for communication with said housing passages, and having also radial ports communicating with said undercut passages to cause passage of liquid to and from the interior of said sleeve, said sleeve having means for sealing the periphery thereof with said housing.

5. The structure set forth in claim 4, further characterized by:

said sleeve being slidably received and maintained in a predetermined position within said housing, and being removable by pulling action from said housing for replacement.

6. In control mechanism for a water softener system which employs a treatment tank having the usual chemical bed, a standpipe and an upper untreated water inlet passage, a regenerant tank having the usual check valve and control means, an untreated water inlet passage and a water outlet passage for servicing the system, those improvements which comprise:

a common housing having a drain passage, a passage for connection with the untreated water inlet and a passage for connection with the treated water discharge, a pair of spaced passages for communication with the ends of a common bypass passage and a passage of smaller cross sectional area for communication with a backwash passage connected with said common passage, and also having a pair of spaced passages for communication with the two ends of a brine and rinse bypass, a common slidably replaceable passage-forming sleeve mounted longitudinally within said housing and having provision for sealed relation with said housing, and having provision for undercut annular passages communicating respectively with the passages provided in said housing, said undercut passages having radial ports extending to the interior of said sleeve, a single reciprocable plunger valve means slidably mounted in said sleeve and carrying a plurality of spool sections, each having at least a pair of sealing elements spaced thereon for engagement with the interior of said sleeve, said spool sections cooperating with the passages and communications of said sleeve to cause flow of water from said untreated water inlet to said treatment tank through said bed and from said treatment tank to said service outlet passage when said plunger is disposed in a predetermined service position.

said spool sections cooperating with the passages and communications of said sleeve when said plunger is moved to a backwash predetermined position to cause flow of water from said untreated inlet to the upper end of said tank standpipe, and through said bed to the top of said tank, and then through said common passage and said backwash passage to the drain passage in said housing, said cooperating parts when said plunger is in the third, brine and rinse position, causing flow of water from said untreated inlet through said injector, then through said common passage into the top of said treatment tank, and then through said bed and out of said tank through said brine and rinse bypass passage, and into the drain passage of said housing, and said cooperating parts being operable in a fourth brine refill position of said plunger to cause refill with water of said regenerant tank.

7. The structure set forth in preceding claim 6 further characterized by:

said common passage-forming sleeve being removably mounted within said housing and said housing having a removable cap and closure member normally seated and sealed against one end of said sleeve, and said sleeve being removable by pulling from said housing when said cap and closure member is first removed from said housing.

8. The structure set forth in claim 6, further characterized by:

a brine ejector bypass having an untreated water inlet and an ejector outlet, the water inlet to said ejector being communicated with the untreated water inlet of said housing when said main valve plunger means is positioned in brine and rinse position with said common passage communicating with the top of said treatment tank, and also when said valve plunger is positioned in the predetermined brine refill position, the ejector outlet of said brine bypass passage being connected with the water flow system only when said valve plunger is in the brine and rinse position.

References Cited

UNITED STATES PATENTS

| 2,670,328 | 2/1954 | Webb | 210—140 |
| 2,906,332 | 9/1959 | Rosten et al. | 210—139 X |
| 2,962,437 | 11/1960 | Lindsay | 210—138 X |
| 3,237,640 | 3/1966 | Whitlock et al. | |
| 3,380,590 | 4/1968 | Grayson | 210—140 X |

REUBEN FRIEDMAN, Primary Examiner

JOHN ADEE, Assistant Examiner

U.S. Cl. X.R.

210—138, 190, 232